US008850150B2

(12) United States Patent
Ramezani

(10) Patent No.: US 8,850,150 B2
(45) Date of Patent: *Sep. 30, 2014

(54) MANAGING SECURITY IN SOLID-STATE DEVICES

(75) Inventor: Mehran Ramezani, Laguna Niguel, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,052

(22) Filed: Jul. 20, 2012

(65) Prior Publication Data

US 2012/0290777 A1    Nov. 15, 2012

Related U.S. Application Data

(63) Continuation of application No. 11/436,845, filed on May 18, 2006, now Pat. No. 8,245,000.

(60) Provisional application No. 60/683,068, filed on May 20, 2005.

(51) Int. Cl.
*G06F 12/14* (2006.01)
*G06F 12/00* (2006.01)
*G06F 21/79* (2013.01)
*G06F 21/78* (2013.01)

(52) U.S. Cl.
CPC .............. *G06F 21/79* (2013.01); *G06F 21/78* (2013.01)
USPC ........... 711/163; 711/103; 711/115; 711/168; 711/169; 711/170; 713/168; 713/169; 713/170; 726/27; 726/28; 726/29; 726/30

(58) Field of Classification Search
None
See application file for complete search history.

(56) References Cited

U.S. PATENT DOCUMENTS

| 5,282,247 | A |  | 1/1994 | McLean et al. |
|---|---|---|---|---|
| 5,293,424 | A |  | 3/1994 | Holtey et al. |
| 5,892,902 | A | * | 4/1999 | Clark .................. 726/5 |
| 6,731,536 | B1 | * | 5/2004 | McClain et al. ......... 365/185.04 |
| 6,804,730 | B1 | * | 10/2004 | Kawashima ................... 710/36 |
| 7,036,004 | B2 |  | 4/2006 | Zitlaw et al. |
| 7,054,990 | B1 | * | 5/2006 | Tamura et al. ................ 711/103 |
| 2004/0243779 | A1 |  | 12/2004 | Okaue et al. |
| 2004/0268074 | A1 |  | 12/2004 | Yagi |
| 2005/0005131 | A1 |  | 1/2005 | Yoshida et al. |
| 2005/0005149 | A1 |  | 1/2005 | Hirota et al. |
| 2005/0015540 | A1 |  | 1/2005 | Tsai et al. |
| 2005/0138390 | A1 | * | 6/2005 | Adams et al. ................. 713/185 |
| 2006/0036873 | A1 |  | 2/2006 | Ho et al. |
| 2007/0016941 | A1 |  | 1/2007 | Gonzalez et al. |

* cited by examiner

*Primary Examiner* — Yaima Rigol
(74) *Attorney, Agent, or Firm* — McDermott Will & Emery LLP

(57) ABSTRACT

A computing device and method for managing security of a memory or storage device without the need for administer privileges. To access the secure memory, a host provides a data block containing a control command and authentication data to the memory device. The memory device includes a controller for controlling access to a secure memory in the memory device. The memory device identifies the control command in the data block, authenticates the control command bused on the authentication data, and executes the control command to allow the host device to access the secure memory.

10 Claims, 4 Drawing Sheets

MANAGING SECURITY IN SOLID-STATE DEVICES

CROSS-REFERENCE TO RELATED APPLICATIONS

This application is a continuation of U.S. patent application Ser. No. 11/436,845, filed on May 18, 2006, and entitled "System and Method for Managing Security of a Memory Device," which claims the benefit of U.S. Provisional Patent Application No. 60/683,068 filed on May 20, 2005 and entitled "System and Method for Managing Security of a Memory Device," which are incorporated by reference in their entirety for all purposes herein.

BACKGROUND

1. Field of Invention

The present invention relates to computer memory and storage devices. More particularly, the present invention concerns a system and a method for managing security of a memory or storage device.

2. Description of Related Art

A computer memory device, also referred to as a storage device, is often used to store data for a host computing device. Typically, the host computer device includes an operating system for managing operation of the memory device. The operating system includes a file system for writing files to the memory device and reading files from the memory device.

In addition to writing files to the memory device and reading files from the memory device using the file system, the operating system may also manage security of the memory device using a device driver. The device driver allows the operating system to provide device specific commands to the memory device, usually through an interface, for managing security of the memory device. The device specific commands, however, are not uniform among memory devices. Consequently, generally, a unique device driver must be installed in the operating system for each type of memory device to be used by the host computing device, which requires administrator privileges in the operating system.

In light of the above, a need exists for managing security of a memory device without the need for administrator privileges in a host computing device. In addition, a need exists for managing security of a memory device without requiring a device driver specific to the memory device in a host computing device.

SUMMARY

In various embodiments of the present invention, a memory device includes a controller that identifies a control command in a data block received from a host device. Preferably, the host sends the data block enclosed within a file, although other embodiments may utilize other structures or arrangements of data for the data block. In addition to various data structures, the data block may also be encapsulated, enclosed or embodied in another structure, such as a file. The controller manages security of the memory device based on the control command. In this way, a custom device driver for the memory device is not needed in the host device. Moreover, administrator privileges are not needed in the host device to manage security of the memory device.

A memory device, in accordance with one embodiment of the present invention, includes a first memory and a controller coupled to the first memory. The controller is configured to receive at least one data block including both a command and authentication data, authenticate the data block based on the authentication data, identify the command, and control access to the first memory based on the command.

A memory device, in accordance with one embodiment of the present invention, stores data of a host device. The memory device includes a memory unit and a controller coupled to the memory unit. The memory unit includes a first memory and second memory. The controller is configured to receive at least one data block including both a command and authentication data from the host device, authenticate the data block, identify the command, and control access from the host device to the second memory based on the command.

In a method for managing security of a memory device, in accordance with one embodiment of the present invention, a host device is prevented from accessing a secure memory of the memory device. At least one data block including both a command and authentication data is received from the host device. The data block is authenticated based on the authentication data, and the command is identified. The command is executed in the memory device to allow the host device to access the secure memory.

The following pages provide various embodiments of the present invention. The present invention has been described using particular illustrative or exemplary embodiments. It is to be understood that the invention is not limited to the described embodiments and that various changes and modifications may be made by one skilled in the art without departing from the spirit and scope of the present invention.

BRIEF DESCRIPTION OF THE DRAWINGS

The features and advantages of the present invention may be better understood with the drawings accompanying the textual description. The drawings illustrate embodiments of the present invention and, together with the textual description, may provide a further understanding of the present invention. In the drawings.

DESCRIPTION

In various embodiments, a memory device includes a secure memory and control memory, through which a host device can obtain access to the secure memory. The host device executes the control instructions to send a file containing a control command and authentication data to the control memory section of the memory device. The memory device authenticates the data block based on the authentication data, identifies the control command in the file, and executes the control command to allow the host device to access the secure memory. As previously disclosed, data blocks may comprise various data structures depending on the embodiment. Further, the data blocks may be encapsulated in files which are transferred between the memory device and the host device. The term data block is not intended to imply a limited type of data structures. The commands may also vary depending on the use and implementation of the particular embodiment.

Figure 1:
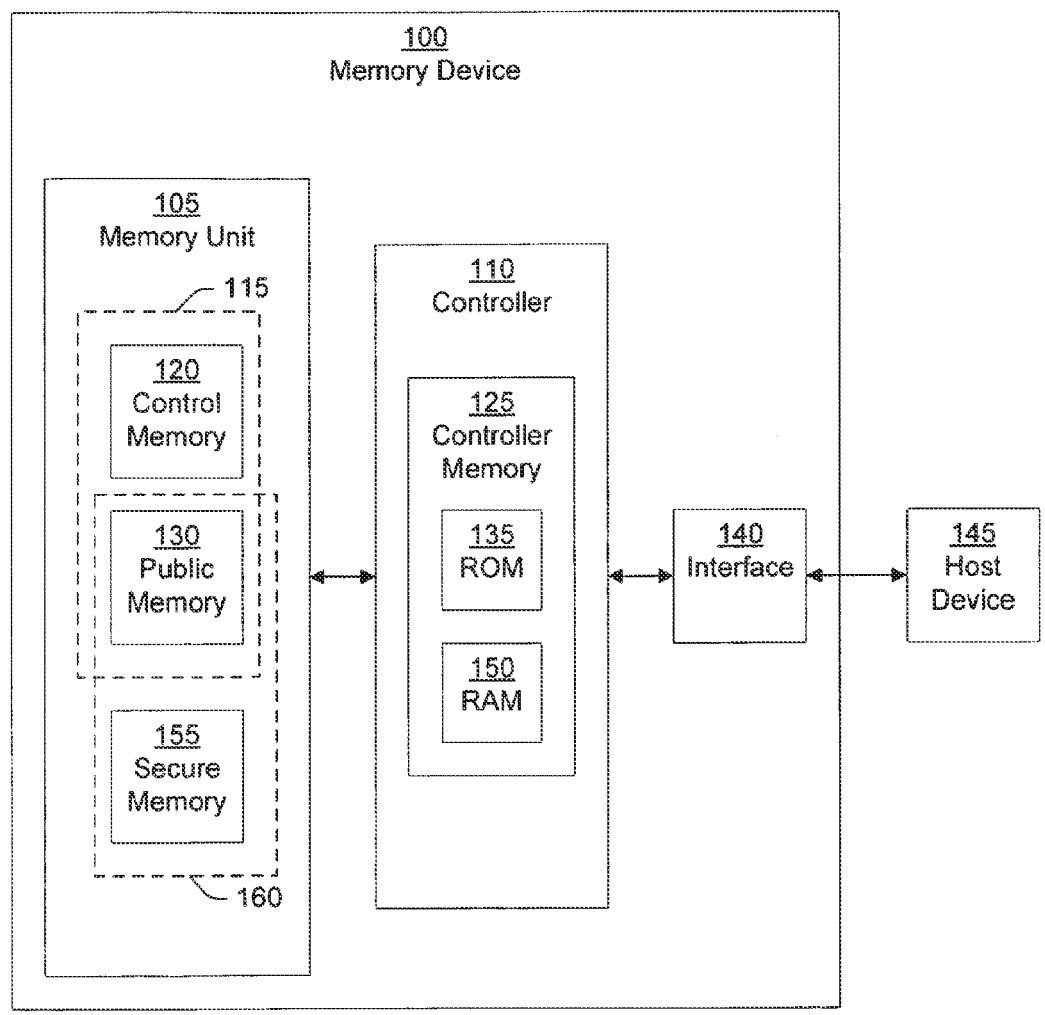
FIG. 1 is a block diagram of a memory device, in accordance with an embodiment of the present invention.

FIG. 1 illustrates a block diagram of a memory device 100, in accordance with an embodiment of the present invention. The memory device 100 includes a memory unit 105, a controller 110, and an interface 140. The controller 110 is coupled in communication with both the memory unit 105 and the interface 140.

In various modes of operation, the interface 140 is coupled in communication with a host device 145. The host device 145 uses a file system to store files into the memory device 100 via the interface 140 and to read files from the memory device 100 via the interface 140. In some embodiments, the host device 145 does not utilize a file system. In various embodiments, the host device 145 stores files into the memory device 100 by writing data blocks into memory device 100. A data block can be any unit of data. For example, a data block may be a sector, a number of sectors, a page, a block, one or more files, or any other data size. In some embodiments, the memory device 100 does not include the interface 140. In these embodiments, the host 145 is coupled in communication with the controller 110.

The controller 110 controls access from the host device 145 to the memory unit 105 based on control commands included in data blocks received by the controller 110 from the host device 145 embodied in a file. In this way, the controller 110 manages security of the memory device 100 without the need for installing a device driver for the memory device 100 in the operating system of the host device 145 and without the need for administrator privileges in the host device 145, although the host device 145 may already have one or more device drivers. In one embodiment, the memory device 100 is a non-volatile storage device, such as a solid-state or flash memory device, and the memory unit 105 is a non-volatile memory device comprising flash memory or flash storage array.

In one embodiment, the controller 110 receives input-output (I/O) commands from the host device 145. The I/O commands may include read data block commands or write data block commands. If an I/O command received by the controller 110 is a read command, the controller 110 reads a data block from the memory unit 105 based on the read command and provides the data block to the host device 145. In a further embodiment, the controller 110 receives the I/O commands from the host device 145 via the interface 140, and provides the data block to the host device 145 via the interface 140.

If an I/O command received by the controller 110 is a write command, the controller 110 also receives a data block associated with the write command from the host device 145, and the controller 110 determines whether the data block includes a control command. If the data block includes a control command, the data block is deemed to be a control block. If the data block does not include a control command, the controller 110 stores the data block into the memory unit 105, based on the write command. If the data block includes a control command, the controller 110 authenticates the data block, identifies the control command, and executes the control command to control access from the host device 145 to the memory unit 105, as is described, more fully herein. Additionally, the controller 110 modifies the data block to indicate a status of the memory device 100 and stores the modified data block into the memory unit 105. The host device 145 can then read the modified data block from the memory unit 105 using a read command to determine the status of the memory device 100. The status of the memory device 100 may include the status of the I/O command, such as whether the I/O command is successful or has failed.

In one embodiment, the memory unit 105 includes a visible (or unlocked) portion 115 and an invisible (or locked or secure) portion 155. The visible portion 115 includes a control memory 120, and may optionally include a public memory 130. A memory portion 160 includes the public memory 130 and the secure memory 155.

The controller 110 accesses data (e.g., reads data or stores data) in the control memory 120 for controlling access to both the secure memory (locked) portion 155 and the unlocked (visible) portion 115 of the memory unit 105, and for updating the status of the memory device 100. For example, the controller 110 may read and store data blocks containing control commands in the control memory 120. Additionally, the controller 110 stores and reads data blocks in the secure memory 155, based on I/O commands received by the host device 145 and if the controller 110 is in locked or unlocked mode. In this way, the controller 110 controls access from the host device 145 to the secure memory 155 based on the commands received by the controller 110 through the files written into control memory 120. In embodiments including the public memory 130, the controller 110 reads and stores data blocks in the public memory 130 based on I/O commands received from the host device 145.

In one embodiment, the memory device 100 includes a controller memory 125. The controller memory 125 stores data and computing instructions for the controller 110. The controller memory 125 may include a read only memory (ROM) 135 preprogrammed with the computing instructions for operating the controller 110 and a random access memory (RAM) 150 for storing data during execution of the computing instructions. The ROM 135 may comprise non-volatile memory, such as flash memory, or other types of memory. The controller memory 125 may be included in the controller 110 as illustrated in FIG. 1. For example, the controller 110 may be a microprocessor, a microcontroller, or an embedded controller including the controller memory 125. Alternatively, the controller memory 125 may be external of the controller 110. For example, the controller 110 may be a logic circuit or a state machine, and the controller memory 125 may be a memory circuit.

The controller 110 initializes the memory device 100, for example on power-up of the memory device 100. During initialization, the controller 110 resets the memory device 100 and determines whether a mode of the memory device 100 is initially set to manufacturing mode. If the mode is set to manufacturing mode, the controller 110 initializes the memory unit 105, which may include erasing memory locations in the memory unit 105. Additionally, the controller 110 initializes the control memory 120 and the controller memory 125. In one embodiment, the controller 110 initializes the control memory 120 and the controller memory 125 based on data received from a programming device external of the memory device 100. Also during initialization, the controller 110 updates a write status (e.g., clears the write status) of the control memory 120 to indicate that the controller 110 has not stored a data block containing a control command into the control memory 120. The controller 110 then updates the mode of the memory device 100 to locked mode. The status of the memory device 100 may include the write status of the control memory 120 and the mode of the memory device 100.

If the controller 110 determines during initialization that the mode of the memory device 100 is not set to manufacturing mode, the controller 110 updates the write status (e.g., clears the write status) of the memory device 100 to indicate that a data block containing a control command has not been stored into the control memory 120. The controller 110 then sets the mode of the memory device 100 to locked mode. Thus, the controller 110 updates the write status indicator and sets the mode to locked mode during initialization regardless of whether the mode is initially set to manufacturing mode.

After the mode of the memory device 100 is set to locked mode, the host device 145 can access the control memory 120 but is prevented from accessing the secure memory 155. In embodiments including the public memory 130, the host device 145 can also access the public memory 130 in locked mode. Although the host device 145 can access the control memory 120 when the mode of the memory device 100 is set to locked mode, portions of the control memory 120 are write-protected by means of standard host device file storage protocols initialized during manufacturing mode.

The controller 110 may identify a control command in a data block (encapsulated within a file) received from the host device 145 indicating that the mode of the memory device 100 is to be set to unlocked mode. For example, the control command may be an unlock command. The controller 110 authenticates the data block to determine whether the control command is authentic. The controller 110 may authenticate the control command based on a signature or a file signature in the data block, a checksum in the data block, a password, any combination thereof, or the like. If the controller 110 determines that the control command is authentic, the controller 110 sets the mode of the memory device 100 to unlocked mode.

Once the mode of the memory device 100 is set to unlocked mode, the controller 110 allows access to the secure memory 155, by the host device 145. In embodiments including the public memory 130, the host device 145 can also access the public memory 130 in unlocked mode. In some embodiments, the controller 110 prevents the host device 145 from accessing the control memory 120, or portions thereof, in unlocked mode, as is described more fully herein.

The controller 110 may receive a lock indicator when the memory device 100 is in unlocked mode. For example, the lock indicator may be an indicator (e.g. a signal indicating) that the memory device 100 is disconnected from the host device 145 or that electrical power supplied to the memory device 100 is not available. In response to the lock indicator, the controller 110 sets the mode of the memory device 100 to locked mode and the memory device 100 enters the locked mode.

Figure 2:
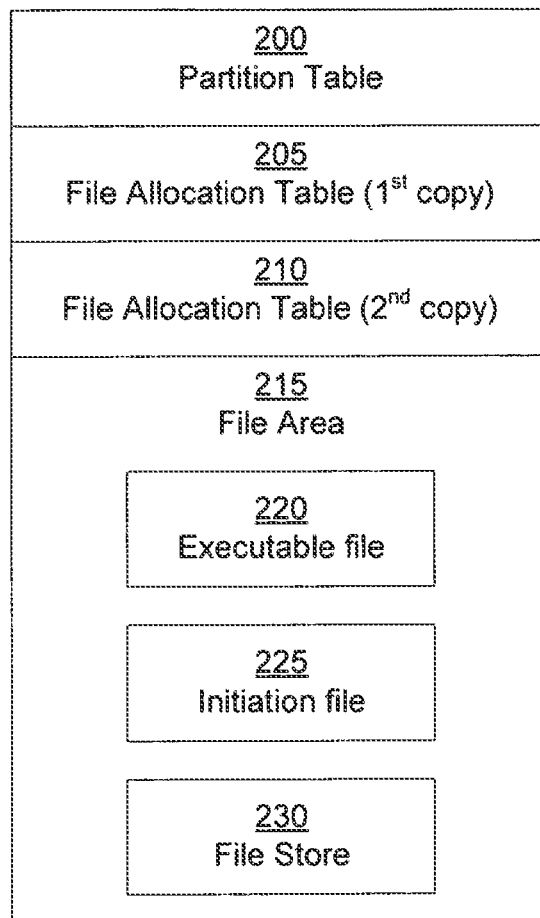
FIG. 2 is a block diagram of a control memory, in accordance with an embodiment of the present invention.

FIG. 2 illustrates a block diagram of the control memory 120, in accordance with an embodiment of the present invention. The control memory 120 comprises a partition table 200, two copies of file allocation table 205 & 210, and file area 215. Additionally, the control memory 120 includes a file store 230 as part of file area 215. The components of the control memory 120 may be stored in the control memory 120 by the controller 110 (FIG. 1). In one embodiment, the file store 230 is limited to storing a single sector file. In other embodiments, the file store 230 can store a multi-sector or larger file.

The partition table 200 identifies partitions in the memory unit 105 (FIG. 1) for the control memory 120 (FIG. 1), the public memory 130 (FIG. 1), and the secure memory 155 (FIG. 1). The memory unit 105 may be a flash memory, and the partition table 200 may identify a partition of the flash memory as the control memory 120, another partition of the flash memory as the public memory 130, and still another partition of the flash memory as the secure memory 155.

The file area 215 includes computing code for controlling (e.g. unlocking) access to the secure memory 155 (FIG. 1). In operation, the host device 145 (FIG. 1) provides a series of read commands to the controller 110 (FIG. 1), and the controller 110 generates corresponding data blocks including the control instructions. The controller 110 provides the data block including the control instruction to the host device 145. The host device 145 then executes the control instructions to obtain access to the control memory 120 and the secure memory 155.

In one embodiment, the control instructions 215 include an executable file 220 and an initiation file 225. The initiation file 225 is used by an operating system of the host device 145 to configure the host device 145 for executing the executable file 220. The initiation file 225 identifies the executable file 220 and may identify an icon for the executable file 220. Additionally, the initiation file 225 may identify icons for the public memory 130 (FIG. 1) and the secure memory 155 (FIG. 1). In embodiments in which the initiation file 225 identifies an icon, the host device 145 (FIG. 1) can use the initiation file 225 to display the icon on an output device of the host device 145, such as a video display. The operating system of the host device 145 executes the executable file 220 based on input from, or in response to, an input device of the host device 145, such as keyboard or a computer mouse. The input from the input device may be a password supplied by a user, which is used to authenticate a data block generated by the host device 145 and stored in the memory device 100 (FIG. 1).

In one embodiment, the host device 145 (FIG. 1) displays an icon for the executable file 220 when the memory device 100 (FIG. 1) is in locked mode, and may also display an icon for the public memory 130 (FIG. 1). For example, the icon for the public memory 130 may depict a disk drive containing a letter designation. When the memory device 100 is in unlocked mode, the operating system of the host device 145 displays an icon for the secure memory 155 (FIG. 1) and may display an icon for the public memory 130, but does not display an icon for the executable file 220. The icon for the public memory 130 may depict a disk drive containing a letter designation and the icon for the secure memory 155 may depict a disk drive containing another letter designation.

The executable file 220 allows a user to generate a data block containing a control command and authentication data (e.g., a control block). The authentication data may be a signature, a checksum, or password, or any combination thereof, or the like. In addition to generating data blocks, the executable file 220 issues requests to the file system of the host device 145 (FIG. 1). In response to the request from the executable file 220, the file system generates I/O commands and provides the I/O commands, along with any associated data blocks generated by the executable file 220, to the memory device 100 (FIG. 1).

Figure 3:
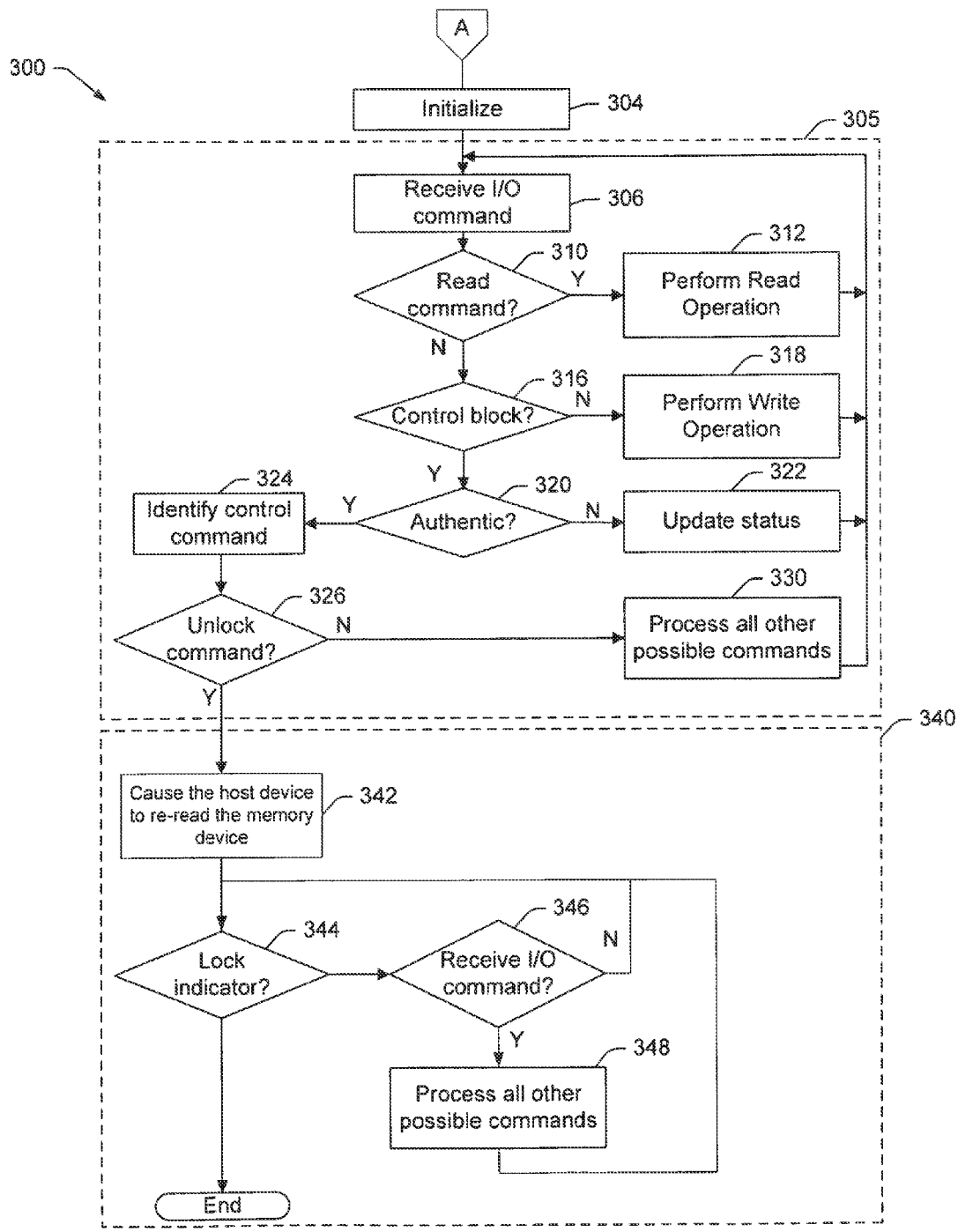
FIG. 3 is a flow chart of a portion of a method for managing security of the memory device, in accordance with an embodiment of the present invention.

FIG. 3 illustrates a flow chart of a method 300 for managing security of the memory device 100, in accordance with an embodiment of the present invention. In step 304, the memory device 100 is initialized. In the initialization process, the memory device 100 is reset, for example by a power-on-reset circuit. Process of memory device initialization is further described in steps 402 through 428 of FIG. 4. After the initialization process, the control memory 120 contains the standard structure for a memory device familiar to the host device 145. As an example of such structure, the control memory may contain partition table 200, file allocation tables 205 and 210 (two copies), and the file area 215. The file area 215 includes control instructions in the form of executable and initiation files written specifically for execution by the host device 145. This invention is not limited to any specific structure and is independent of the specifics of the host device 145 standard structure for the memory devices. However, for the preferred operation of memory device 100, it is important that the control memory 120 be initialized to a standard structure and control instructions be understood by the host device 145. In one embodiment, the initialization process is performed by a device, such as a device used in manufacturing. After the initialization process is complete, the memory device 100 is deemed to be operating in a locked mode 305. In the locked mode 305, the host device 145 can access the visible portion 115 (control memory 120 and public memory 130) of the memory unit 105. As illustrated in FIG. 3, the memory device 100 performs steps 306-330 in the locked mode 305. The method 300 then proceeds to step 306.

In step 306, the memory device 100 receives an I/O command, such as a read command or a write command. The memory device 100 may receive the I/O command from the host device 145. If the I/O command is a write command, the memory device 100 also receives a data block associated with the write command. The data block may include a control command and authentication data. In one embodiment, the interface 140 (FIG. 1) receives the I/O command from the host device 145 and provides the I/O command to the controller 110. The method 300 then proceeds to step 310.

In step 310, the memory device 100 determines whether the I/O command is a read command. In one embodiment, the controller 110 determines whether the I/O command is a read command. If the I/O command is a read command, the method 300 proceeds to step 312, otherwise the I/O command is deemed to be a write command and the method 300 proceeds to step 316.

In step 312, arrived at from the determination in step 310 that the I/O command is a read command, the controller 110 reads a data block from the control memory 120 of the memory unit 105, based on the read command, and provides the data block to the host device 145. In one embodiment, the controller 110 reads the data block from the public memory 130 and provides the data block to the host device 145 via the interface 140. The method 300 then returns to step 306.

In step 316, arrived at from the determination in step 310 that the I/O command is a write command, the memory device 100 determines whether the data block associated with the write command is a control block. In one embodiment, the controller 110 determines whether the data block is a control block by determining whether the write command includes an address, such as a logical block address (LBA), in the control memory 120. If the write command includes an address in the control memory 120, the data block is determined to be a control block. The controller 110 may use other techniques or methods for determining if a data block is a control block, depending on the embodiment. If the data block is not a control block, the method 300 proceeds to step 318, otherwise the method 300 proceeds to step 320.

In step 318, arrived at from the determination in step 316 that the data block is not a control block, the memory device 100 stores the data block into the public memory 130 or control memory according to the write operation. After the data block is stored into the public memory 130, the method 300 returns to step 306.

In step 320, arrived at from the determination in step 316 that the data block is a control block, the memory device 100 determines whether the data block is authentic by authenticating the data block. The memory device 100 may determine whether the data block is authentic based on a signature or a file signature, a checksum, a password, any combination thereof, or the like. The controller 110 may also use other algorithms, methods, indicators, or devices to determine if a data block in authentic. In one embodiment, the controller 110 determines whether the data block is authentic. If the data block is not authentic, the method 300 proceeds to step 322, otherwise the method 300 proceeds to step 324.

In step 322, arrived at from the determination in step 320 that the data block is not authentic, the memory device 100 updates its status to indicate that the data block is not authentic. In one embodiment, the controller 110 updates the status of the memory device 100 to indicate that the data block is not authentic. The method 300 then returns to step 306.

In step 324, arrived at from the determination in step 320 that the data block associated with the write command is authentic, the memory device 100 identifies the control command in the data block. In one embodiment, the controller 110 identifies the control command in the data block. The method 300 then proceeds to step 326.

In step 326, the memory device 100 determines whether the control command is an unlock command. In one embodiment, the controller 110 determines whether the control command is an unlock command. If the control command is not an unlock command, the method 300 proceeds to step 330, otherwise the memory device 100 is deemed to enter in unlocked mode 340 and the method 300 proceeds to step 342. In the unlocked mode 340, the host device 145 can access the secure memory 155 of the memory unit 105. As illustrated in FIG. 3, the memory device 100 performs steps 342-362 in the unlocked mode 340.

In step 330, arrived at from the determination in step 326 that the control command is not an unlock command, the controller 110 parses the command structure for other commands which may take advantage of this device such as commands to purge all data and wipe the secure memory so that the memory device can be recycled. The method 300 then returns to step 306.

In step 342, arrived at from the determination in step 326 that the control command is an unlock command, the controller 110 performs a function as defined by the interface 140 to force the host device 145 to re-read the memory device 100. In some embodiments, the function is a standard function as defined by the interface 140 or some other manner. Re-reading the memory device 100 in the "unlocked mode" by the host device 145 would cause the host device 145 to view the memory unit 105 as the memory portion 160 instead of memory portion 115.

In step 344, arrived at from the determination in step 342, the memory device 100 determines whether a lock indicator is set in the memory device 100. The lock indictor may be set if the memory device 100 is about to be powered-down or if the memory device 100 is disconnected from the host device 145. In one embodiment, the controller 110 determines whether the lock indicator is set. If the lock indicator is not set, the method 300 proceeds to step 346, otherwise the 300 method ends. In an alternative embodiment, the memory device 100 is deemed to be operating in locked mode 305 if the lock indicator is set, and the method 300 instead returns to step 306.

In step 346, arrived at from the determination in step 342 that the lock indicator is not set, the memory device 100 determines whether an I/O command is received. In one embodiment, the controller 110 determines whether the memory device 100 received an I/O command from the host device 145. If the memory device 100 received an I/O command, the method 300 proceeds to step 348, otherwise the method 300 returns to step 344.

In step 348, arrived at from the determination in step 346 that the memory device 100 received an I/O command, the controller 110 processes the I/O command and then the method proceeds to step 344.

Figure 4:
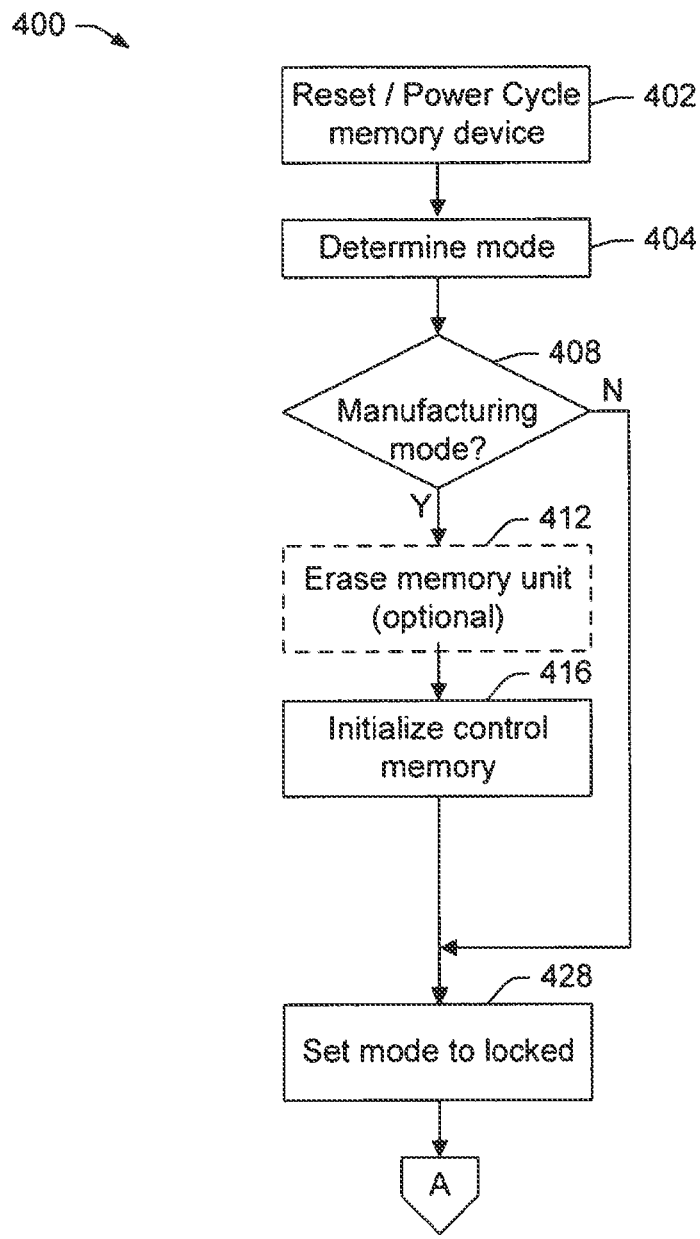
FIG. 4 is a flow chart of a portion of a method for managing security of the memory device, in accordance with an embodiment of the present invention.

FIG. 4 illustrates a flow chart of a portion of a method 400 for managing security of the memory device 100, in accordance with an embodiment of the present invention. The portion of the method 400 illustrated in FIG. 4 depicts the initialization and manufacturing mode of the memory device 100. In step 402, the memory device 100 is reset or taken through a power cycle. Generally, power is cycled, or a power cycle occurs, when a device is powered-down and then powered-up. In one embodiment, the controller 110 includes a power-on-reset circuit that resets the memory device 100 when the memory device 100 is powered-up. The method 400 then proceeds to step 404.

In step 404, a mode of the memory device 100 is determined. In one embodiment, the controller 110 determines the mode of the memory device 100 based on the status of the memory device 100. The method 400 then proceeds to step 408.

In step 408, the memory device 100 determines whether the mode is set to manufacturing mode. In one embodiment, the controller 110 determines whether the mode is set to manufacturing mode. If the mode is set to manufacturing mode, the method 400 proceeds to step 412, otherwise the method 100 proceeds to step 428.

In optional step 412, the memory device 100 erases the contents of the memory unit 105. In one embodiment, the memory unit 105 is a flash memory, and the controller 110 erases the contents of the flash memory. In various embodiments, step 412 may be optional depending on the type of memory and the type of application. The method 400 then proceeds to step 416.

In step 416, the control memory 120 is initialized to contain the partition table 200, the two file allocation tables 205 and 210, and the file area 215 containing control instructions 220 and 225. In one embodiment, the controller 110 receives the partition table 200, the file allocation tables 205 and 210, and the control instructions 220 and 225 from a programming device or a manufacturing device, and stores them into the control memory 120. The method 400 then proceeds to step 420. In another embodiment, the controller 110 has the above components within the memory device 100 or can create the components at run-time.

In step 428, arrived at from step 416 or from the determination in step 408 that the mode of the memory device 100 is not set to manufacturing mode, the mode of the memory device 100 is set to locked triode. In one embodiment, the controller 110 modifies the status of the memory device 100 to set the mode to locked mode.

The embodiments described herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is to be understood that the present invention is not limited to only the embodiments illustrated.

What is claimed is:

1. A memory device comprising:
   a first memory;
   a second memory comprising a first file allocation table for the first memory;
   a controller coupled to the first memory and to the second memory, wherein the controller is configured to:
   provide control instructions to a host device;
   receive at least one data block from the host device;
   determine if the at least one data block comprises a control command;
   in a case where the at least one data block comprises a control command, authenticate the at least one data block based on authentication data included within the at least one data block, identify the control command, and set a mode of the memory device to control access to the first memory by subsequent input-output commands from the host device based on the control command; and
   prevent access to the first memory by preventing access to the first file allocation table; and
   a third memory coupled to the controller, the second memory further comprising a second file allocation table for the third memory.

2. The memory device of claim 1, wherein the controller is further configured to store, in a case where the at least one data block does not comprise the control command, the at least one data block in the first memory.

3. The memory device of claim 1, wherein the controller is further configured to initially prevent access to the first memory, the controller further configured to execute the control command to allow access to the first memory.

4. The memory device of claim 1, wherein the authentication data includes a file signature.

5. The memory device of claim 1, wherein the authentication data includes a password.

6. The memory device of claim 1, wherein the first memory is a flash memory.

7. A memory device for storing data of a host device, comprising:
   a memory unit comprising a first memory, a second memory and a third memory, the third memory being configured to store a first file allocation table for the first memory and a second file allocation table for the second memory; and
   a controller coupled to the memory unit,
   wherein the controller is configured to:
   provide control instructions to the host device;
   receive at least one data block from the host device;
   allow the host device to access the first memory;
   determine if the at least one data block comprises a control command;
   in a case where the at least one data block comprises a control command, authenticate the at least one data block based on authentication data included within the at least one data block, identify the control command, and set a mode of the memory device to control access from the host device to the second memory by subsequent input-output commands based on the control command, and
   wherein the controller is configured to prevent the host device from accessing the second memory by preventing the host device from accessing the second file allocation table.

8. The memory device of claim 7, wherein the controller is further configured to store, in a case where the at least one data block does not comprise the control command, the at least one data block in the first memory.

9. The memory device of claim 7, wherein the controller is configured to initially prevent the host device from accessing the second memory, the controller further configured to subsequently execute the control command to allow the host device to access the second memory with subsequent input-output commands.

10. The memory device of claim 7, wherein the third memory is further configured to store a partition table for allocating a portion of the memory unit to the first memory and another portion of the memory unit to the second memory.

* * * * *